United States Patent [19]

Brion

[11] Patent Number: 4,761,729
[45] Date of Patent: Aug. 2, 1988

[54] DEVICE FOR EXCHANGING DATA BETWEEN A COMPUTER AND A PERIPHERAL UNIT HAVING A MEMORY FORMED BY SHIFT REGISTERS

[76] Inventor: Alain Brion, 15, rue Kermen, F 92140 Clamart, France

[21] Appl. No.: 820,989

[22] Filed: Jan. 21, 1986

[30] Foreign Application Priority Data

Jan. 24, 1985 [FR] France ............................... 85 00970

[51] Int. Cl.$^4$ .............................................. G06F 13/14
[52] U.S. Cl. ................................................ 364/200
[58] Field of Search ................. 364/200, 900; 377/64, 377/77

[56] References Cited

U.S. PATENT DOCUMENTS

| | | | |
|---|---|---|---|
| 3,274,556 | 9/1966 | Paul et al. | 364/900 |
| 3,631,402 | 12/1971 | Field | 364/900 |
| 4,040,026 | 8/1977 | Gernelle | 364/200 |
| 4,052,699 | 10/1977 | Micka et al. | 364/900 |
| 4,153,950 | 5/1979 | Nosowicz et al. | 365/231 |
| 4,333,159 | 6/1982 | Bigall et al. | 364/900 |
| 4,649,512 | 3/1987 | Nukiyama | 364/900 |

FOREIGN PATENT DOCUMENTS 127007 5/1984 European Pat. Off. .

Primary Examiner—Raulfe B. Zache
Assistant Examiner—Emily Y. Chan
Attorney, Agent, or Firm—Cesari and McKenna

[57] ABSTRACT

This is a device for exchanging data between a computer and a peripheral unit. The data supplied by the computer are words of N binary characters (bits), and the data received by the peripheral unit are words of P bits. The device comprises a memory formed by P shift registers of N bits, an address decoding circuit for addressing the registers during exchanges of data, a control unit receiving from the decoding circuit a signal controlling the shifts in the registers. The registers are connected to the computer to receive P words of N bits which are transferred to the peripheral units. They also enable N words of P bits to be transferred to the computer when the peripheral unit supplies P words of N bits.

10 Claims, 2 Drawing Sheets

DEVICE FOR EXCHANGING DATA BETWEEN A COMPUTER AND A PERIPHERAL UNIT HAVING A MEMORY FORMED BY SHIFT REGISTERS

The invention relates to a device for exchanging data between a computer and a peripheral unit.

It applies to exchanges of data between a computer and a peripheral unit wherein the data are grouped in the form of words which have a different size for the computer and for the peripheral unit.

The invention relates more particularly to exchanges of data in the form of words between a computer and a printer.

BACKGROUND OF THE INVENTION

Certain peripheral units must of course receive from a computer words of data having a predetermined size. However, very often the words supplied by the computer have a size which is incompatible with the size of the words which the peripheral unit can deal with.

This is the case, for example, with certain graphic printers, which must receive simultaneously data corresponding to a certain number of consecutive lines: in the computer each line is represented by a sequence of words in which each word corresponds to two juxtaposed dots of a line of the graphic image traced by the printer. Words of data whose size is different from that of the words of the computer must therefore be delivered to the peripheral unit (a printer in the example under consideration), the data of each word received by the peripheral unit corresponding to superposed dots of a column of the graphic image.

In contrast, in certain other applications the peripheral unit must transmit to the computer words whose size does not correspond to that of the words which the computer can accept.

The known methods, which enable, for example, a computer to deliver to a peripheral unit words such that the computer handles them and which enable the peripheral unit to receive them as it requires them, are of two kinds:

in one of the methods, data coded in a manner directly compatible with the peripheral unit are recorded in the computer memory, and processing is carried out directly in that format. If the sizes of the words are incompatible, this supposes that either a number of words of the computer are used for one word of the peripheral unit, or on the contrary, a portion of the computer word is used for a word of the peripheral unit. This forms a first disadvantage. Moreover, the processing may be inapplicable to such data coding. Thus, for example, in the case of a printer the computer produces a sequence of words for each line of the graphic image, and the peripheral unit must receive words corresponding to superposed points of a column of such graphic image. One of the known methods consists in representing the image to be obtained internally, in the computer, by words representing dots of the same column. This type of method is incompatible with sceen-type memories, since the screen is swept horizontally. Neither is it compatible with image-compressing methods, which favor the horizontal direction;

another kind of known method uses the computer itself to transcode the words. However, the usual instructions of computers are ill-adapted to such processing, so that processing lasts too long. For example a modern microprocessor takes 4 seconds to return an image of 4 million dots. Such a duration is incompatible with mass printing as allowed, for example, by a laser printer. Moreover, the data output must take the form of words of the size demanded by the printer. For example, for a telecopying machine operating by the standard of group 4, the computer must handle words of 8 bits; this is inefficient and demands the full-time mobilization of the computer while the printing of a whole page lasts.

SUMMARY OF THE INVENTION

It is an object of the invention to obviate these disadvantages and more particularly to provide a device for the exchange of data between a computer and a peripheral unit, by means of which, when the computer supplies, for example, P words of N bits, the periphal unit receives N words of P bits (P being the size of the words which the peripheral unit can accept); in one variant the device also enables the computer to receive P words of N bits when the peripheral unit supplies N words of P bits.

The invention relates to a device for exchanging data between a computer and a peripheral unit, the data supplied by the computer being words of N binary characters (bits) and the data received by the peripheral unit being words of P bits, N and P being integers, wherein it comprises at least one memory formed by P shift registers of N bits, an address decoding circuit connected to the shift registers and the computer for addressing the registers during exchanges of data, a control unit connected to control inputs of the shifts in the registers and a control output of the decoding circuit to receive a signal controlling the shifts in the registers, the shift registers each having N parallel inputs connected to the computer to receive P words of N bits, each register having a series output, the P series outputs of the P registers being connected to inputs of the peripheral unit via a transfer means to transfer thereto the P words of N bits contained in the shift registers.

According to another feature, the shift registers also each comprise a series input, the P series inputs of the registers being connected to outputs of the peripheral unit via another transfer means to receive N words of P bits, the registers also each having P parallel outputs connected to inputs of the computer to transfer thereto the P words of N bits contained in the shift registers, such other means of transfer taking part in an exchange of data between the peripheral unit and the computer.

According to another feature, the transfer means connecting the P outputs of the registers to inputs of the peripheral unit is formed by a bus.

According to another feature, the other transfer means connecting outputs of the peripheral unit to the P series inputs of the registers is formed by another bus.

According to another feature, the transfer means comprises a queue-type memory (FIFO) adapted to record at least N words of P bits, P inputs of the memory being connected to the P series outputs of the shift registers and P inputs of the memory being connected to the inputs of the peripheral unit, the control unit having at least one output connected to a control input of the queuetype memory to supply thereto a signal fixing the frequency of reception by such memory of N words of P bits coming from the shift registers.

According to another feature, the other transfer means comprises a queue-type memory (FIFO) adapted to record at least N words of P bits, P inputs of such memory being connected to the outputs of the peripheral unit to receive N words of P bits, and P outputs of the memory being connected to the P series inputs of the shift registers, the control unit having at least one output connected to a control input of the memory to supply thereto a signal fixing the frequency of reception by the memory of N words of P bits coming from the peripheral unit, or the frequency of transmission to the shift registers of N words of P bits contained in such memory.

According to another feature, the P inputs of the queue-type memory are connected to the P series outputs of the shift registers via a three-state bus and the P outputs of such memory are connected to the inputs of the peripheral unit via a three-state bus.

According to another feature, the outputs of the peripheral unit are connected to the P inputs of the queue-type memory via a three-state bus, and the P outputs of such memory are connected to the P series inputs of the shift registers via a three-state bus.

According to another feature, an input of the control unit is connected to a state output of the queue-type memory to receive a signal indicating the state of the queue in such memory.

According to another feature, an input of the computer is connected to a state output of the queue-type memory to receive a signal indicating the state of the queue in such memory.

According to another feature, an input of the computer is connected to an output of the control unit to receive a signal indicating that the shift registers are empty or full, when the words contained therein have been transferred.

According to another feature, the output of the control unit is connected to the input of the queue-type memory via a switching means.

BRIEF DESCRIPTION OF THE DRAWINGS

The features and advantages of the invention will be gathered more clearly from the following description with reference to the accompanying drawings, wherein.

DETAILED DESCRIPTION OF THE PREFERRED EMBODIMENTS

Figure 1:
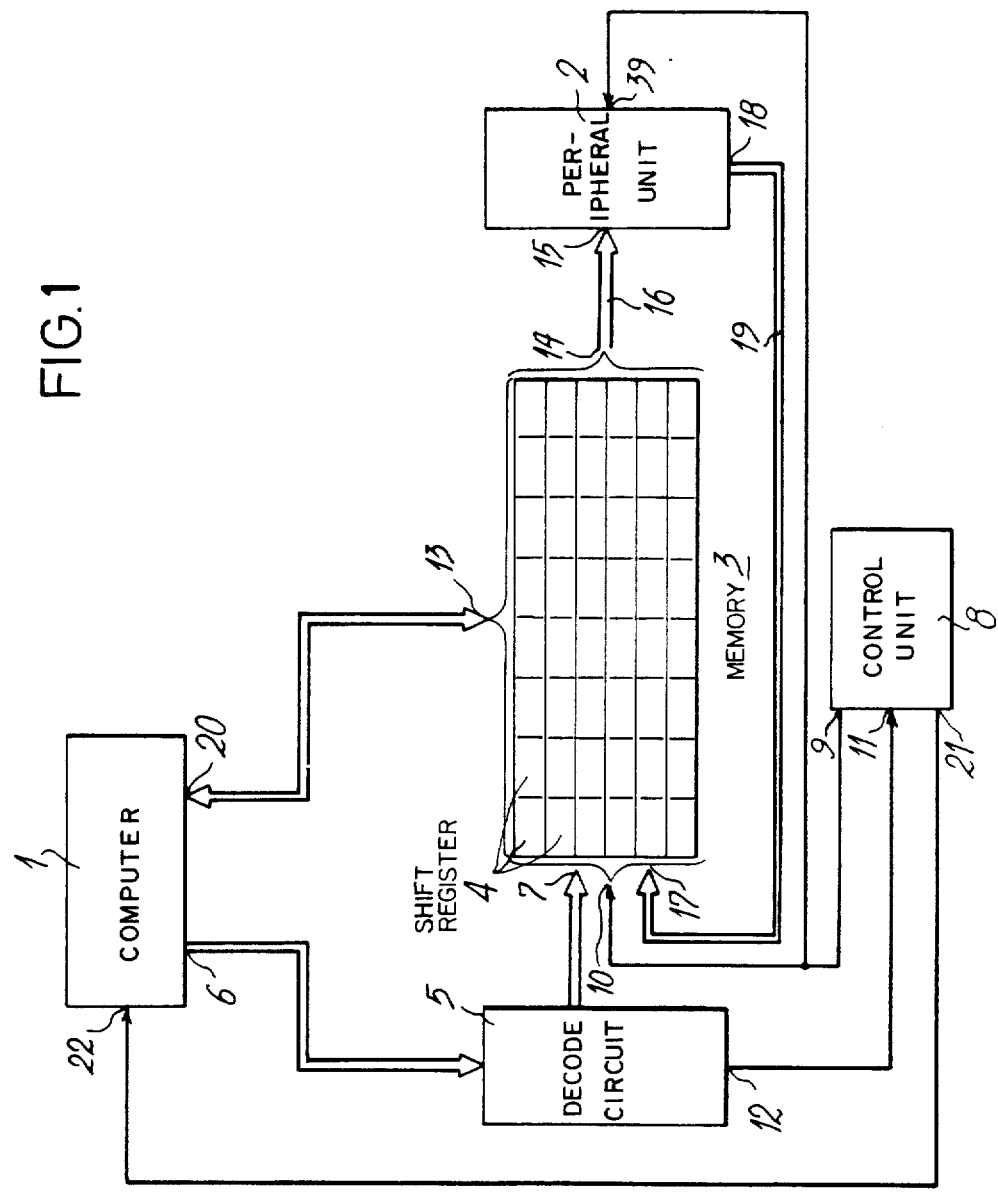
FIG. 1 shows diagrammatically a first embodiment of the device according to the invention.

FIG. 1 illustrates diagrammatically a first embodiment of a data-exchanging device according to the invention. In a first variant of this embodiment, the device enables data to be transmitted from a computer 1 to a peripheral unit 2. The data supplied by the computer are words of N bits, while the data received by the peripheral unit must be words of P bits. N and P are, of course, integers. The device comprises at least one memory 3 formed by P shift registers of N bits. In the embodiment shown in FIG. 1, the memory 3 comprises six shift registers, as register 4, each of the registers being capable of recording 8 bits, i.e. (P=6, N=8). The device also comprises an address decoding device 5 (for example, type 74 LS 138, marketed by TEXAS INSTRUMENTS) which is connected to two control and addressing outputs 6 of the computer and to addressing inputs 7 of the shift registers 4. The device also comprises a control unit 8, which is connected via an output 9 to a shift control inputs 10 in the registers 4 and to a control input 39 of the peripheral unit 2. The control unit is also connected via an input 11 to a control output 12 of the decoding circuit, to receive therefrom a control signal of the shifts in the registers 4. In this first variant of the first embodiment of the device according to the invention, the shift registers each comprise N parallel inputs 13 connected to the computer 1, to receive therefrom P words of N bits (6 words of 8 bits in the embodiment illustrated). Each shift register 4 comprises a series output. The P series outputs 14 (6 series outputs in the embodiment illustrated) of the shift registers are connected to inputs 15 of the peripheral unit 2 via a transfer means 16. The transfer means enables the P words of N bits contained in the shift register to be transferred to the peripheral unit 2 in the form of N words of P bits, as will be described in greater detail hereinafter. The means of transfer 16 is in this embodiment formed by a bus.

In a second variant of this first embodiment, the peripheral unit 2 transmits to the computer 1 N words of P bits, while the computer can accept only words of N bits; in that case each of the shift registers comprises one series input. The P series inputs are shown at place 17 in the drawing, being connected to outputs 18 of the peripheral unit 2 via another transfer means 19, so that such registers receive at each operating sequence N words of P bits. In this second variant the shift registers 4 each comprise P parallel outputs connected to inputs 20 of the computer 1, to transfer thereto P words of N bits which they contain, when the peripheral unit 2 has completely filled them. The other transfer means 19 is in this embodiment also formed by a bus.

The control unit 8 is not shown in detail; it is formed, for example, by a clock connected to a counter. The inputs and outputs of this control circuit are in fact inputs and outputs of the counter. The output 9 of the control circuit controls the shifts in the registers 4 of the memory 3 and the transfer of data to or from the peripheral unit 2. The triggering of the shifts is controlled by a signal supplied at output 12 of the decoding circuit 5 and applied to an input 11 of the control circuit 8. The address decoding circuit 5 is controlled by the computer 1, which supplies at its outputs 6 coded address signals applied to the decoding circuit 5. The decoding circuit enables the shift registers of the memory 3 to be addressed, successively. For each address the output 12 of the decoding circuit 5 applies to the input 11 of the counter of the control circuit 8 a control signal so that such circuit supplies at its output 9 the number of pulses required for the shifts of the data in each of the registers 4. The control circuit 8 also comprises an output 21 which is connected to an input 22 of the computer 1, to apply thereto a signal indicating that the shift registers are emtpy. The signal is supplied at the output 21 of the control unit 8 when all the words contained in the shift registers have been transferred to or from the peripheral unit 2.

In the first variant of this first embodiment, the computer transfers the data to the P shift registers of the memory 3 by addressing them successively by means of the decoding circuit 5. As soon as all the shift registers 4 have been charged, the control circuit is notified of the fact by a signal applied to its input 11 by the decoding circuit 5. The control circuit then begins the following sequence of N shifts by successively sending N pulses to its output 9. The pulses cause N shifts in the registers 4 and the transfer of N words of P bits to the peripheral unit 2, by means of a control signal applied to an input 39 of such unit by the output 9 of the control circuit 8.

In the second variant of this first embodiment, the computer is notified by a signal applied to its input 22 by the control unit 8 that the series of shifts in the registers is completed; it reads the data present in the shift registers 4, addressing them successively by means of the decoding circuit 5. As soon as all the shift registers have been read, the control circuit 8 is notified of the fact by a signal applied to its input 11 by the decoding circuit 5; the control circuit begins the following sequence of N shifts by successively delivering N pulses to its output 9; the pulses cause N shifts in the registers 4 and the transfer of N words of P bits to the output of the peripheral unit 2, by means of a control signal applied to the input 39 of such unit by the output 9 of the control circuit 8.

Figure 2:
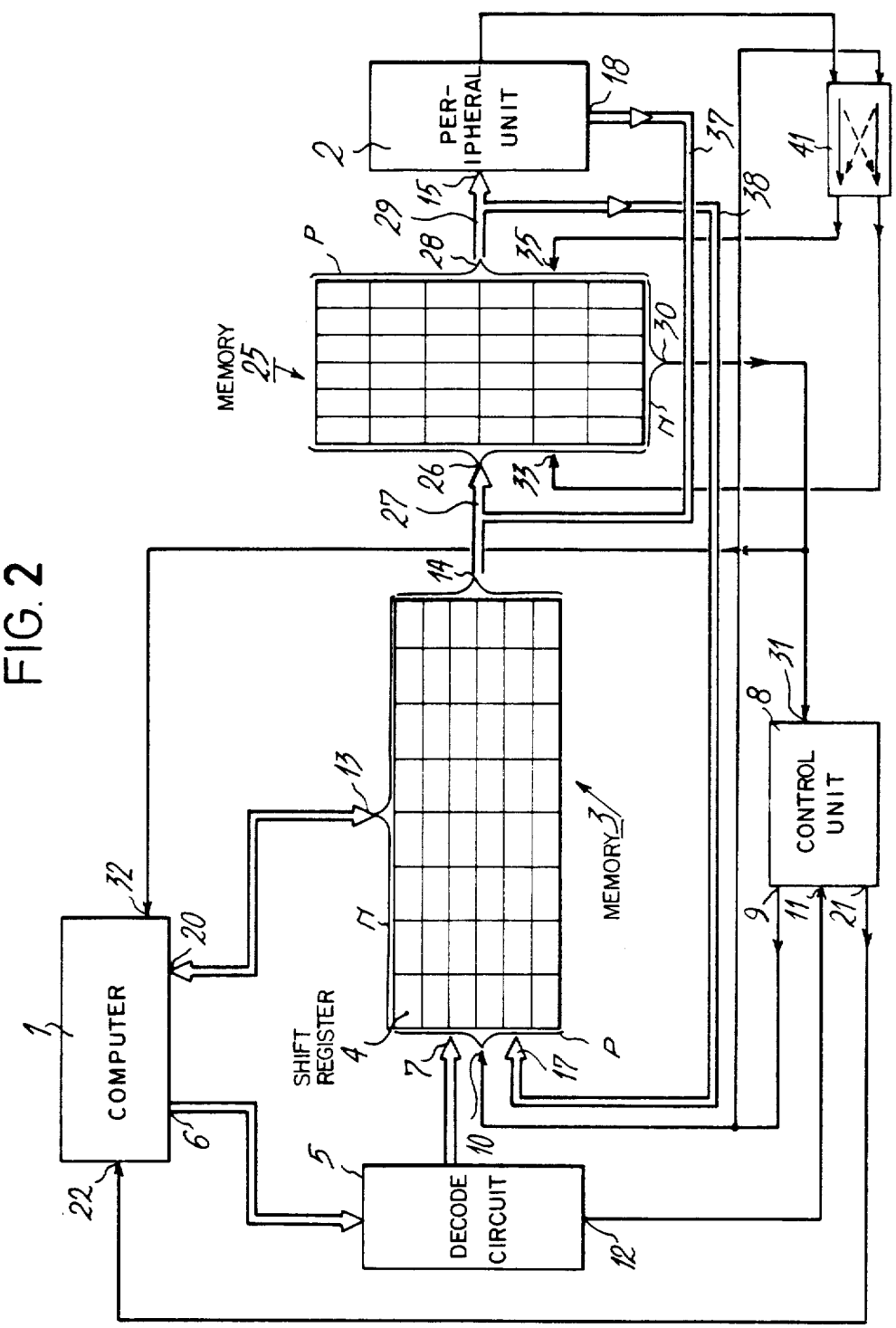
FIG. 2 shows a second embodiment of the device according to the invention.

FIG. 2 illustrates diagrammatically a second embodiment of the device according to the invention. In FIG. 2 like elements have like references to those in FIG. 1. In a first variant of this second embodiment of the device according to the invention, the data are transferred from the computer 1 to the peripheral unit 2, as before, by applying P words of N bits to the parallel inputs 13 of the shift registers 4 of the memory 3. The addressing of the registers is performed, as indicated hereinbefore, by the decoding circuit 5; this circuit applies addressing signals to the addressing inputs 7 of the registers 4. When data are exchanged to the peripheral unit 2, N words of P bits can be transferred. The transfer means comprises a queue-type memory 25 (FIFO) which can record at least N words of P bits. In this first variant, the P series outputs 14 of the shift registers 4 are connected to P inputs 26 of the queue-type memory 25, preferably via a three-state bus 27. The memory comprises P outputs 28 which are connected to the inputs 15 of the peripheral unit 2, preferably via a bus 29. A state output 30 of the FIFO-type memory 25 is connected to an input 31 of the control unit 8 and/or and input 32 of the computer 1, to supply to the control circuit 8 and/or the computer 1 a signal indicating the state of filling of the queue of the memory 25. For example, the signal indicates that the queue is half empty or half full; such information is important for continuing or stopping the filling of the memory 25.

In this first variant the output 9 of the control unit 8 is connected via a switching means 41 to an input 33 controlling data input into the memory 25. An output 40 for sequencing the transfer of data from the peripheral unit 2 is connected by the same switching means to an input 35 controlling the output of data from the FIFO-type memory 25. The switching means 41 is formed, for example, by two two-way multiplexers of a multiplexer quadruple of type SN 75157, marketed by the TEXAS INSTRUMENTS Company.

In this first variant of the second embodiment of the device according to the invention, P words of N bits are supplied by the computer; the P words are applied successively to the parallel inputs of the shift registers 4 by means of the successive addressing of the registers by the address decoding circuit 5. When the shift registers are full, the control circuit 8 transmits at its output 9 shift control pulses to the shift control inputs 10 of the registers 4; at the same time, these pulses input data into the FIFO-type memory 25 by means of a control signal applied to the input 33 thereof. When N shift pulses have been applied to the inputs 10, N words of P bits have been transferred to the queue-type memory 25 by the bus 27. The output 21 of the control unit 8 then applies to the input 22 of the computer 1 a signal indicating that the shift registers are empty and that they can be refilled. The state signal at the output 30 of the memory 25 permanently indicates to the control unit 8 the state of filling of the queue of words in the FIFO-type memory 25. At the moment at which the transfer of the words contained in the registers 4 starts, the memory receives at its write-in input 33 a signal coming from the control unit 8 to enable words to be written into the memory 25 in synchronism with the shift pulses applied to the shift inputs 10 of the registers 4. At the same time, the peripheral unit 2 takes at its own frequency the data coming from the FIFO-type memory 25 in a totalling asynchronous manner. To this end, the output 40 of the peripheral unit 2 is connected by the switching means 41 to an input 35 controlling the output of data from the queue-type memory 25.

In another variant of this second embodiment, the device enables N words of P bits to be transferred from the peripheral unit 2 to the computer 1, for the latter to receive P words of N bits. The transfer is performed by another transfer means which comprises, as in the first variant of this second embodiment, a queue-type (FIFO) memory 25 capable of recording at least N words of P bits. The P inputs 26 of the memory 25 are connected to the outputs 18 of the peripheral unit 2 via a three-state bus 37. The P outputs 28 of the memory 25 are connected to the P series inputs 17 of the shift registers 4 of the memory 3 via a bus 38. The N words of P bits are transmitted to the FIFO-type memory 25 by the peripheral unit, at its own frequency. The peripheral unit 2 sends the data to the FIFO-type memory 25 by means of a control signal supplied by its output 40, which is connected via the switching means 41 to the input 33 controlling the input of data to the queue-type memory 25. When the latter is full enough, the control unit is notified of the fact by a signal applied to its input 31 by the state output 30 of the FIFO-type memory 25. This signal enables the control unit 8 to apply to the input 35 a signal controlling the reading of N words contained in the memory 25. These N words are successively transmitted by the bus 38 to the series inputs 17 of the shift registers 4 of the memory 3. The P bits of each word, applied to the series inputs 17 of the registers 4, are shifted therein by shift pulses supplied by the control unit 8 to the shift inputs 10 of the registers 4. These pulses also control the output of data from the FIFO-type memory 25 via the switching means 41, which connects the output 9 of the control unit 8 to an input 35 controlling the output of data from the FIFO-type memory 25. When the registers 4 are filled, the computer controls the addressing of the registers by the decoding circuit 5, so that P words of N bits are transmitted thereto successively by the parallel outputs of the registers 4. These P words are applied to the inputs 20 of the computer 1. The output 12 of the decoding circuit indicates to the control circuit that the computer has read the P words. As in the first variant of this second embodiment, the state output 30 of the FIFO-type memory 25 is connected to the input 32 of the computer 1 and/or the input 31 of the control unit 8, to supply at each moment a signal indicating the state of filling of the queue in the memory 25. The signal supplied at the output 36 of the peripheral unit 2 allows the control of the flow of transmission of the words supplied by the peripheral unit 2.

The control unit 8, formed by a clock connected to a counter, is, for example, made up from circuits of type 74LS74.

What is claimed is:

1. A device for exchanging data between a computer and a peripheral unit, the data supplied by the computer being words of N binary characters (bits) and the data received by the peripheral unit being words of P bits, N and P being integers, wherein said device comprises at least one memory formed by P shift registers of N bits, an address decoding circuit connected to the shift registers and the computer for addressing the registers during exchanges of data, a control unit connected to control inputs of the shifts in the registers and to a control output of the decoding circuit to receive from the decoding circuit a signal controlling the shifts in the registers, the shift registers each having N parallel inputs connected to the computer to receive P words of N bits, each register having a series output, the P series outputs of the P registers being connected to inputs of the peripheral unit via a transfer means to transfer thereto the P words of N bits contained in the shift registers, said shift registers also each comprising a series input, the P series inputs of the registers being connected to outputs of the peripheral unit via a bus transfer means to receive N words of P bits, the registers also each having P parallel outputs connected to inputs of the computer to transfer thereto the P words of N bits contained in the shift registers, the bus transfer means connected to the P series inputs and to the peripheral unit permitting an exchange of data between the peripheral unit and the computer.

2. A device according to claim 1 wherein the transfer means connecting the P outputs of the registers to inputs of the peripheral unit are formed by a bus.

3. A device according to claim 1 wherein the transfer means comprise a FIFO memory for recording at least N words of P bits, P inputs of the FIFO memory being connected to the P series outputs of the shift registers and P output of the FIFO memory being connected to the inputs of the peripheral unit, the control unit having at least one output connected to a control input of the FIFO memory to supply thereto a signal fixing the frequency of reception by said FIFO memory of N words of P bits coming from the shift registers.

4. A device according to claim 1 wherein said bus transfer means comprises a FIFO memory for recording at least N words of P bits, P inputs of said FIFO memory being connected to the outputs of the peripheral unit to receive N words of P bits, and P outputs of said FIFO memory being connected by a bus to the P series inputs of the shift registers, the control unit having at least one output connected to a control input of said FIFO memory to supply thereto a signal fixing the frequency of transmission to the shift registers of N words of P bits contained in said FIFO memory.

5. A device according to claim 3, wherein the P inputs of the FIFO memory are connected to the P series outputs of the shift registers via a three-state bus.

6. A device according to claim 4, wherein the bus connecting the outputs of the peripheral unit to the P inputs of said FIFO memory is a three-state bus.

7. A device according to claim 3 or 4, wherein an input of control unit is connected to a state output of said FIFO memory to receive a signal indicating the state of filling of said FIFO memory.

8. A device according to claims 3 or 4 wherein an input of the computer is connected to a state output of said FIFO memory to receive a signal indicating the state of filling of said FIFO memory.

9. A device according to claim 1 wherein an input of the computer is connected to an output of the control unit to receive a signal indicating that the shift registers are empty or full, when the words contained therein have been transferred.

10. A device according to claim 3 or 4 wherein the output of the control unit is connected to the input of said FIFO memory via switching means.

* * * * *